United States Patent [19]
Butterworth et al.

[11] 4,210,537
[45] Jul. 1, 1980

[54] LIQUID TREATMENT APPARATUS

[75] Inventors: Donald J. Butterworth, Stirling; Leo F. Ryan, Bridgewater, both of N.J.

[73] Assignee: Ecodyne Corporation, Lincolnshire, Ill.

[21] Appl. No.: 943,404

[22] Filed: Sep. 18, 1978

[51] Int. Cl.² .................... B01D 27/00; B01D 29/00
[52] U.S. Cl. ..................... 210/323 T; 210/193; 210/238; 210/452
[58] Field of Search ............ 210/75, 193, 232, 238, 210/323 T, 448, 450, 451, 452; 285/267, 361, 375, 396, 402

[56] References Cited

U.S. PATENT DOCUMENTS

| | | | |
|---|---|---|---|
| 1,845,882 | 2/1932 | Litschge | 285/361 |
| 2,015,786 | 10/1935 | Carcano | 285/361 X |
| 2,119,331 | 5/1938 | Jensen | 285/361 X |
| 2,233,471 | 3/1941 | Clements | 285/396 X |
| 2,500,955 | 3/1950 | Martinet et al. | 285/361 X |
| 2,547,106 | 4/1951 | Zachariassen | 285/375 X |
| 2,714,021 | 7/1955 | Froidevaux | 285/375 X |
| 3,279,608 | 10/1966 | Soriente et al. | 210/323 T X |
| 3,405,807 | 10/1968 | Burkhardt | 210/323 T X |
| 3,438,502 | 4/1969 | Schmidt, Jr. et al. | 210/323 T X |
| 3,615,016 | 10/1971 | Soriente et al. | 210/323 T X |
| 3,674,287 | 7/1972 | Selley | 285/396 X |
| 3,702,708 | 11/1972 | Moore | 285/361 X |
| 3,803,532 | 4/1974 | Taxon | 285/361 X |

Primary Examiner—Robert H. Spitzer
Attorney, Agent, or Firm—Joel E. Siegel; Charles M. Kaplan

[57] ABSTRACT

A liquid precoat filter has a multitude of elongated replaceable filter elements that have one of their ends supported on tubes that project upwardly from a tube sheet. A multi-component, spring-biased, sliding seal prevents leakage between the filter elements and their support tubes. Externally engageable connectors are used to releasably fasten the filter elements to their tubes.

8 Claims, 3 Drawing Figures

U.S. Patent  Jul. 1, 1980  4,210,537
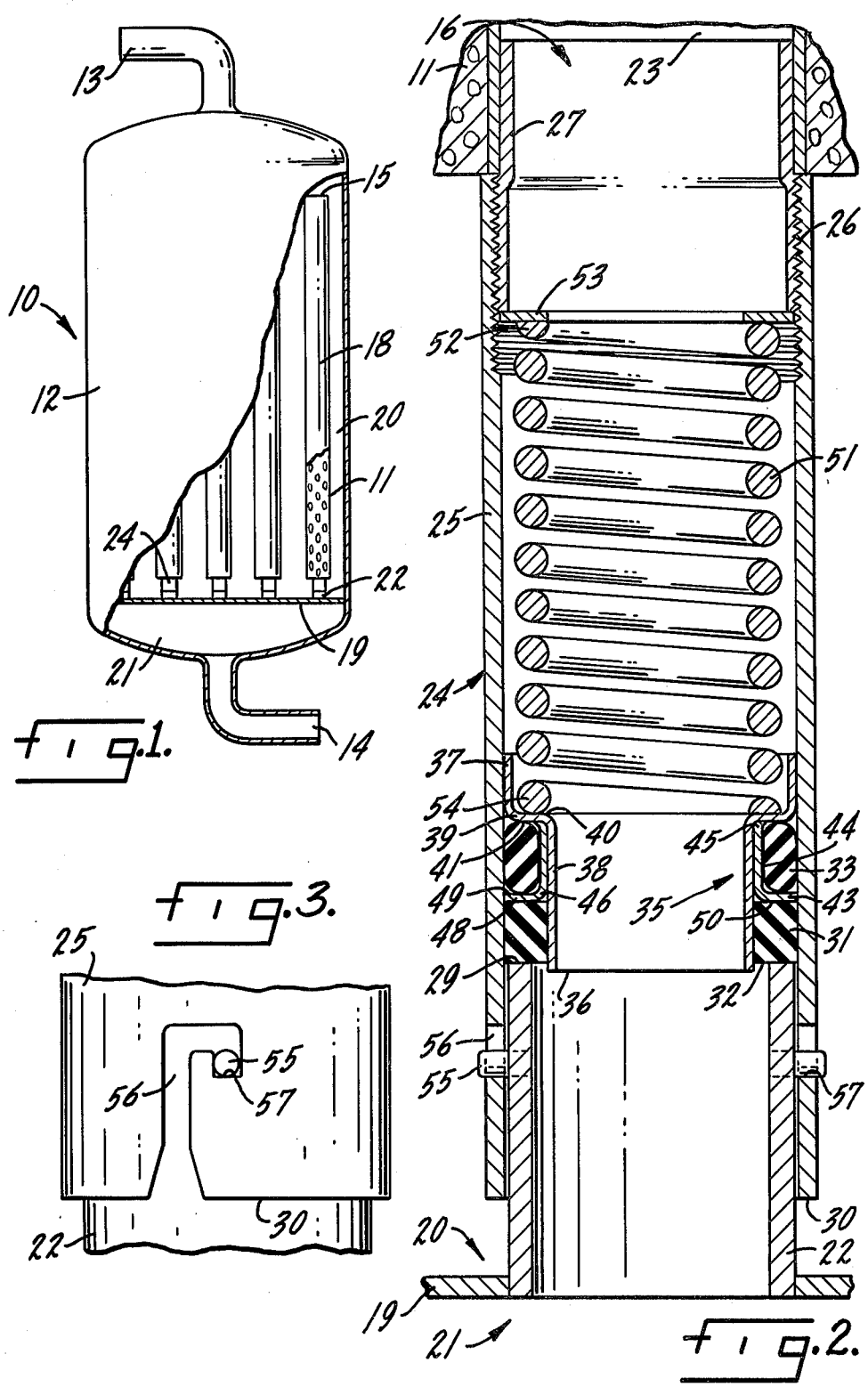

LIQUID TREATMENT APPARATUS

BACKGROUND OF THE INVENTION

This invention relates to the treatment of liquids, and more particularly to water filters that are precoated by replaceable powders.

Liquid filters that provide the high purity water required for the steam generation of electricity are commonly precoated on the outside with diatomaceous earth or powdered ion exchange resins. Such filters may have five hundred or more individual filter elements that are each over six feet in length. Full utilization of the water treating capability of such precoat materials requires that the precoat be uniformly applied over the full length of each filter element. When the energy used to produce the steam for electric power generation comes from a nuclear reactor, the filtering equipment becomes highly radioactive, and the individual filter elements must be capable of being installed and removed from a remote location. During prolonged usage, the dimensions of the individual filter element may vary, as for example when a wound nylon filter element shrinks during high temperature service.

OBJECTIVES OF THE INVENTION

Accordingly, it is an object of this invention to provide improved liquid treatment apparatus.

Another object is to provide a liquid precoat filter having a uniform pressure drop throughout its length.

Another object is to provide a seal for liquid filter elements that will not leak when the elements shrink or otherwise change their dimensions.

Another object is to protect the seal in a liquid filter from damage.

Another object is to provide a liquid filter with individual filter cartridges that can be installed and removed from a remote location.

Another object is to provide a liquid filter of reduced pressure drop having relatively long filter candles that are uniformly precoated throughout their length.

Another object is to reduce the amount of material used inside of a liquid treatment vessel that does not directly treat the liquid.

Another object is to provide a high pressure liquid precoat filter with relatively inexpensive, durable, easily installed, and maintained seals that do not possess defects found in the prior art.

Other objects and advantages of the invention will be found in the specification and claims, and the scope of the invention will be set forth in the claims.

DESCRIPTION OF THE DRAWING

FIG. 1 is a schematic, partially broken-away, side view of a precoated liquid filter in accord with this invention.

FIG. 2 is an enlarged, partially broken-away, crosssectional view showing the details of the seal for the filter elements in FIG. 1.

FIG. 3 is an enlarged, fragmentary side view showing a way of releasably connecting a filter element.

DESCRIPTION OF THE INVENTION

The drawing shows a liquid filter 10 in which a plurality of individual, porous, elongated, cylindrical filter elements 11 are enclosed in a pressurized vessel 12 having an untreated liquid inlet 13 and a treated liquid outlet 14. Filter elements 11 have closed upper ends 15 and open lower ends 16. Upper ends 15 may be supported in any known manner in vessel 12. Elements 11 may be made from commonly used materials, such as wound nylon or polypropylene threads or from stainless steel screens. Elements 11 may be precoated in conventional manner with a layer 18 of powdery material. A tube sheet 19 spans the lower portion of vessel 12 and divides the vessel into a relatively high pressure, untreated liquid chamber 20 communicating with inlet 13, and a relatively low pressure, treated liquid chamber 21 communicating with outlet 14. A plurality of tubes 22 are welded or otherwise attached to sheet 19 in a fluid-tight manner. Tubes 22 project into chamber 20 and the inside of the tubes communicate with chamber 21 through tube sheet 19. Each filter element 11 is axially aligned with a tube 22, and the interior of each element 11 communicates with chamber 21 through its associated tube. Liquid being treated enters chamber 20 through inlet 13, passes through the precoat layers 18 and the elements 11, and thus receives a predetermined treatment. The treated liquid passes through the cylindrical space 23 at the center of each element, through tubes 22 into chamber 21, and exits through outlet 14. Periodically, precoat layer 18 is backwashed from elements 11 and replaced with fresh material in conventional manner.

Each filter element 11 has a sliding seal 24 attached to it for preventing leakage of untreated liquid from chamber 20 between such element and its tube 22 into chamber 21. Seal 24 includes a central support cylinder 25 having a threaded upper end 26. A cylindrical threaded adapter ring 27 has one of its ends secured to the open end 16 of an element 11 and a threaded end screwed into end 26 of cylinder 25; the interior of cylinder 25 communicates with the interior of element 11 through ring 27. The terminal end 29 of tube 22 telescopes into the bottom end 30 of cylinder 25, and tube 22 extends into cylinder 25 for at least about one-third of the length of the cylinder. A flat-sided O-ring gasket 31 is held within cylinder 25, and one of its surfaces 32 sealingly engages tube terminal end 29. A circular O-ring gasket 33 is held within cylinder 25, and one of its surfaces sealingly engages the inside wall of cylinder 25 between gasket 31 and the open end 16 of element 11.

Gaskets 31 and 33 are retained within cylinder 25 by a movable, hollow, generally cylindrical seal cage 35. A first unitary hollow member 36 has a first axially extending annular rim 37 adjacent to the inside surface of support cylinder 25 and a second axially extending annular rim 38 spaced from the inside surface of cylinder 25. The diameter of second rim 38 is less than the diameter of tube terminal end 29. A wall 39 of member 36 extends transversely of cylinder 25 and connects rims 37 and 38. Wall 39 defines a first shoulder 40, which faces element open end 16, and a second shoulder 41, which faces tube terminal end 29. A second unitary hollow member 43 has an axially extending sleeve 44 spaced from the inside surface of cylinder 25. Sleeve 44 telescopes over and tightly engages second rim 38 of member 36. One end 45 of sleeve 44 abuts second shoulder 41, and the other end 46 of the sleeve terminates short of the terminal end of rim 44. A flange 48 extends transversely of cylinder 25 and has one end integral with end 46. Flange 48 defines a third shoulder 49, which faces element open end 16, and a fourth shoulder 50, which faces tube terminal end 29. Gasket 31 is retained by second rim 38, and the gasket bears against fourth shoulder 50. Gasket 33 is retained by sleeve 44, and the gasket bears against second shoulder 41 and third shoulder 49. Members 36 and 43 are immovable relative to each other, and gaskets 31 and 33 are carried together in seal cage 35 as the cage slides up and down in cylinder 25. Instead of using members 36 and 43, cage 35 may be fabricated as a unitary element.

A coil spring 51 within cylinder 25 has one end 52 bearing against a washer 53 that abuts ring 27 at the open end 16 of element 11 and its other end 54 bearing against first shoulder 40 for maintaining sealing force on gasket 31. Rim 37 retains end 54 of spring 51. Gasket 31 provides a seal between tube 22 and cage 35, and gasket 33 provides a seal between cage 35 and cylinder 25. The friction produced by deformation of gaskets 31 and 33 against the inside of cylinder 25 prevents the parts of seal 24 in cylinder 25 from falling out when element 11 is disengaged from tube 22. The components of seal 24 are coaxially aligned with element 11 and tube 22.

Suitable means, such as conventional bayonet studs 55 on tube 22 and mating J-shaped slots 56 in cylinder 25, are provided for releasably connecting element 11 to tube 22. Cylinder 25 may be inserted over tube 22 by manipulation of element end 15 from a remote location. Element 11 is then rotated until studs 55 engage slots 56, spring 51 is compressed by pressing down on end 15, and the element is locked in place by twisting it until studs 55 are seated in the tips 57 of slots 56. The force of compressed spring 51 holds studs 55 securely in tips 57. The filter elements 11 may be removed by reversing the above locking procedure.

It has thus been shown that by the practice of this invention the pressure drop within elongated filter elements 11 will not be caused to vary as a result of the seals 24, since all components of seals 24 are outside of the length of elements 11 where filtering occurs. The use of a first gasket 31 and a second gasket 33 of different shape biased by spring 51 prevents leakage when filter element dimensions vary, and the gaskets are protected within the cylinders 25. The sliding seals 24 permit the filter elements 11 to be installed and removed by rotation of tube ends 15 from a location remote from where the elements connect to tubes 22, and worn components of the seals are easily replaced.

While the present invention has been described with reference to a particular embodiment, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. A liquid filter comprising:
   A. a pressurized vessel having an untreated liquid inlet and a treated liquid outlet;
   B. a tube sheet spanning a portion of said vessel and defining an untreated liquid chamber communicating with said inlet and a treated liquid chamber communicating with said outlet;
   C. a plurality of tubes attached to said tube sheet and projecting into said untreated liquid chamber, the inside of said tubes communicating with said treated liquid chamber through said tube sheet;
   D. a plurality of elongated porous filter elements, each having a closed end and an open end, each of said open ends being axially aligned with one of said tubes and communicating with said treated liquid chamber through its associated tube;
   E. means for releasably connecting said filter elements to said tubes; and
   F. sliding seals for preventing leakage from said untreated liquid chamber between said filter elements and tubes into said treated liquid chamber, each such seal comprising:
      1. an open-ended central support cylinder having one end attached to the open end of one of said filter elements, the interior of said support cylinder communicating with the interior of such filter element;
      2. the terminal end of one of said tubes extending into the other end of said support cylinder;
      3. a first annular gasket within said support cylinder, one surface of said first gasket sealingly engaging said terminal end of said tube;
      4. a second annular gasket within said support cylinder, one surface of said second gasket sealingly engaging the inside wall of said support cylinder between said first gasket and said open end of said filter element;
      5. a movable hollow seal cage within said support cylinder comprising:
         a. a first member having an axially extending annular rim spaced from the inside of said support cylinder, a wall defining a first shoulder which faces said open end of said filter element and a second shoulder which faces said terminal end of said tube, said second gasket means bearing against said second shoulder, and said first gasket means being retained by said rim;
         b. a second member having an axially extending sleeve spaced from the inside of said support cylinder, said sleeve telescoping over and tightly engaging said rim of said first member, one end of said sleeve abutting said second shoulder and the other end of said sleeve terminating short of the terminal end of said second rim, a flange having one end connected to said other end of said sleeve, said flange defining a third shoulder which faces said open end of said filter element and a fourth shoulder which faces said terminal end of said tube, said second gasket means being retained by said sleeve and bearing against said third shoulder, and said first gasket means bearing against said fourth shoulder; and
      6. spring means within said support cylinder bearing against said filter element and said first shoulder for maintaining a sealing force on said first gasket.

2. The invention defined in claim 1, wherein said spring means is a coil spring.

3. The invention defined in claim 1, wherein said first annular gasket means is a flat sided O-ring.

4. The invention defined in claim 1, wherein said second annular gasket means is a circular O-ring.

5. The invention defined in claim 1, wherein said tube telescopes into said support cylinder for at least about one-third of the length of said support cylinder.

6. The invention defined in claim 1, further comprising a threaded coupling ring having one end screwed to an end of said support cylinder and another end attached to said open end of said filter element.

7. The invention defined in claim 1, wherein said seal cage further comprises said first member having another axially extending annular rim adjacent to the inside of said support cylinder, the diameter of said annular rim that is spaced from the inside of said support cylinder being less than the diameter of said terminal end of said tube, said wall extending transversely of said support cylinder connecting said rims, and said spring means being retained by said rim that is adjacent to the inside of said support cylinder.

8. A liquid precoat filter comprising:
   A. a pressurized vessel having an untreated liquid inlet and a treated liquid outlet;
   B. a tube sheet spanning a portion of said vessel and defining an untreated liquid chamber communicating with said inlet and a treated liquid chamber communicating with said outlet;
   C. a plurality of tubes attached to said tube sheet and projecting into said untreated liquid chamber, the inside of said tubes communicating with said treated liquid chamber through said tube sheet;
   D. a plurality of elongated porous filter elements, each having a closed end and an open end, each of said open ends being axially aligned with one of said tubes and communicating with said treated liquid chamber through its associated tube;
   E. means for releasably connecting said filter elements to said tubes; and
   F. sliding seals for preventing leakage from said untreated liquid chamber between said filter elements and tubes into said treated liquid chamber, each such seal comprising:
      1. an open-ended central support cylinder having one end attached to the open end of one of said filter elements, the interior of said support cylinder communicating with the interior of such filter element;
      2. the terminal end of one of said tubes telescoping into the other end of said support cylinder for a distance of at least about one-third of the length of said support cylinder;
      3. a flat-sided O-ring gasket within said support cylinder, one surface of said flat-sided O-ring gasket sealingly engaging said terminal end of said tube;
      4. a circular O-ring gasket within said support cylinder, one surface of said circular O-ring gasket sealingly engaging the inside wall of said support cylinder between said flat-sided O-ring gasket and said open end of said filter element;
      5. a movable, generally cylindrical hollow seal cage within said support cylinder comprising:
         a. a first unitary hollow member having a first axially extending annular rim adjacent to the inside of said support cylinder, a second axially extending annular rim spaced from the inside of said support cylinder, the diameter of said second annular rim being less than the diameter of said terminal end of said tube, a wall extending transversely of said support cylinder and connecting said first and second rims, said wall defining a first shoulder which faces said open end of said filter element and a second shoulder which faces said terminal end of said tube;
         b. a second unitary hollow member having an axially extending sleeve spaced from the inside of said support cylinder, said sleeve telescoping over and tightly engaging said second rim of said first member, one end of said sleeve abutting said second shoulder and the other end of said sleeve terminating short of the terminal end of said second rim, a flange extending transversely of said support cylinder and having one end integral with said other end of said sleeve, said flange defining a third shoulder which faces said open end of said filter element and a fourth shoulder which faces said terminal end of said tube;
         c. said flat-sided O-ring gasket being retained by said second rim and bearing against said fourth shoulder, said circular O-ring gasket being retained by said sleeve and bearing against said second and third shoulders; and
         d. a coil spring within said support cylinder having one end bearing against said open end of said filter element and its other end bearing against said first shoulder for maintaining a sealing force on said flat-sided O-ring gaskets.

* * * * *